Figure 10:
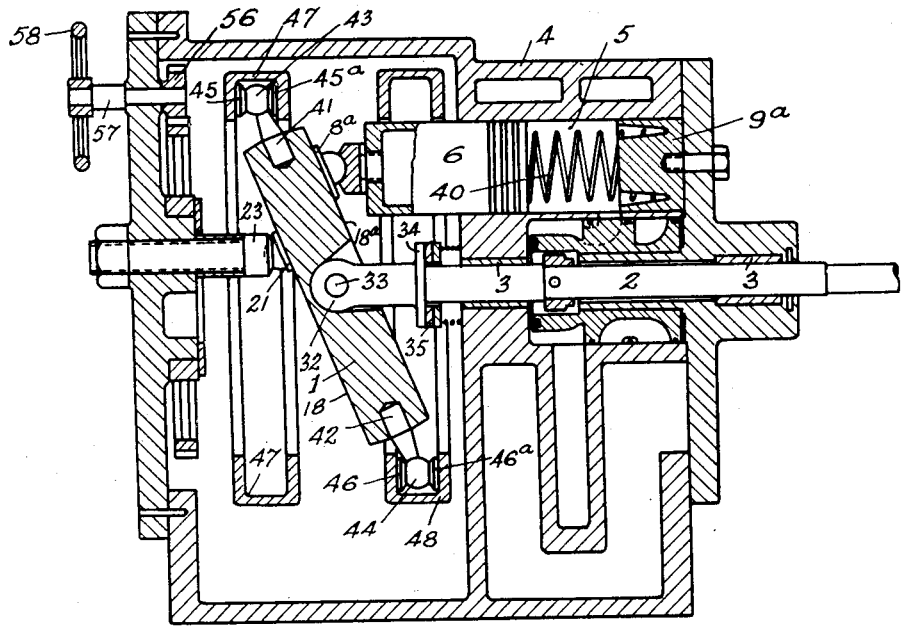

April 17, 1928.  1,666,539
A. G. M. MICHELL
SWASH PLATE OR SLANT TYPE RECIPROCO ROTARY MECHANISM
Filed May 23, 1924　6 Sheets-Sheet 1
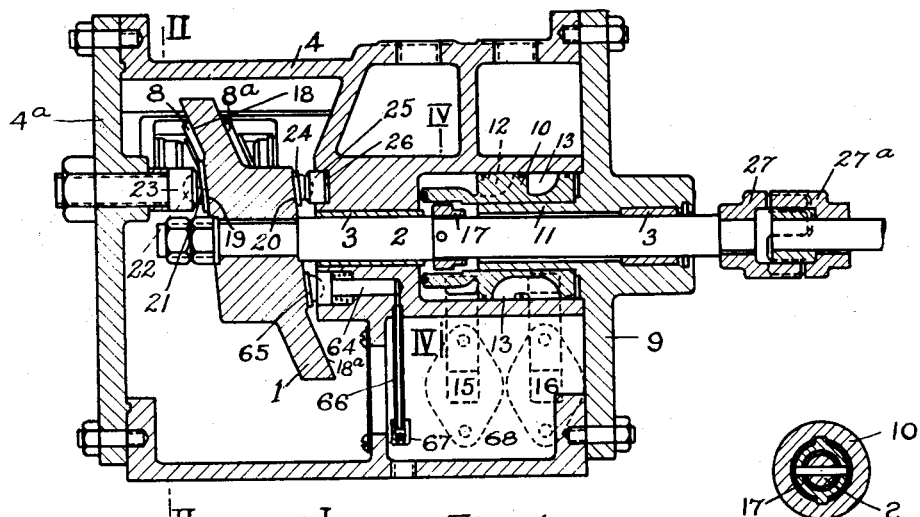
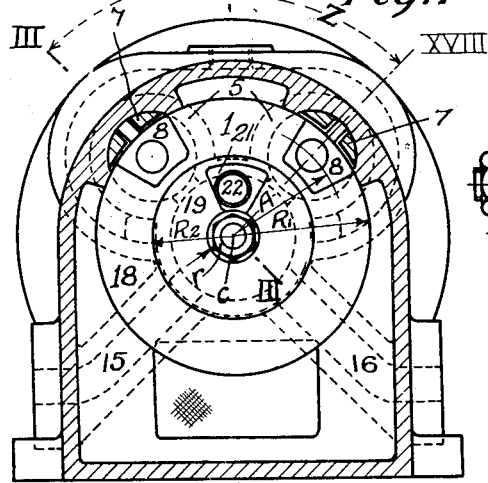
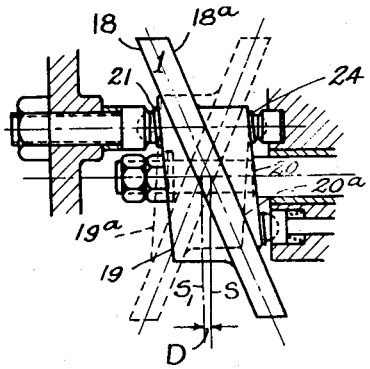
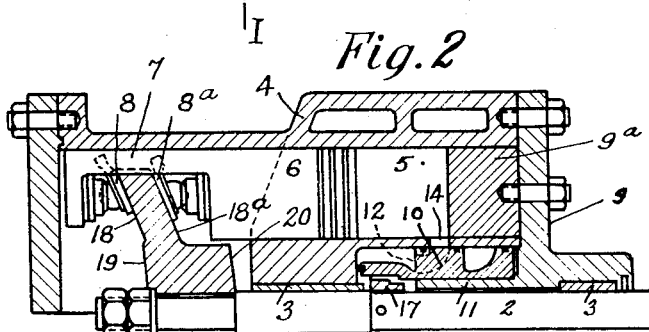

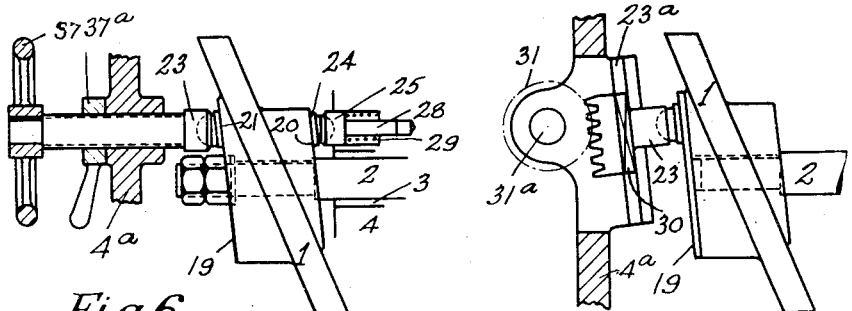
Fig. 6.
Fig. 7.
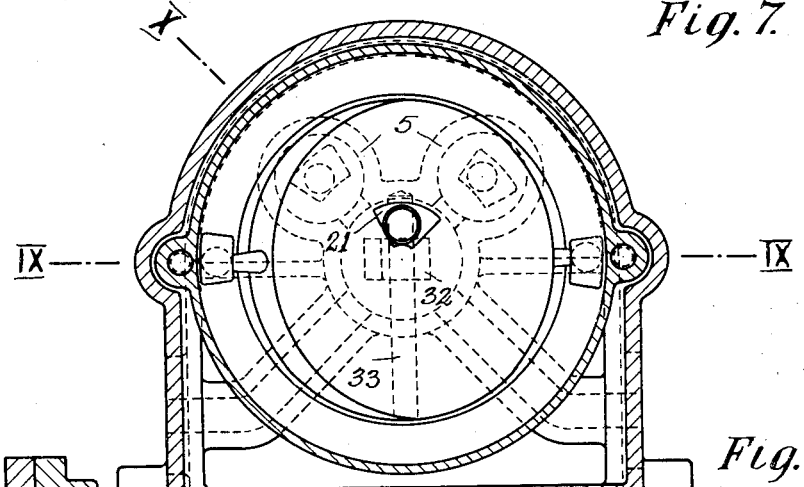
Fig. 8.
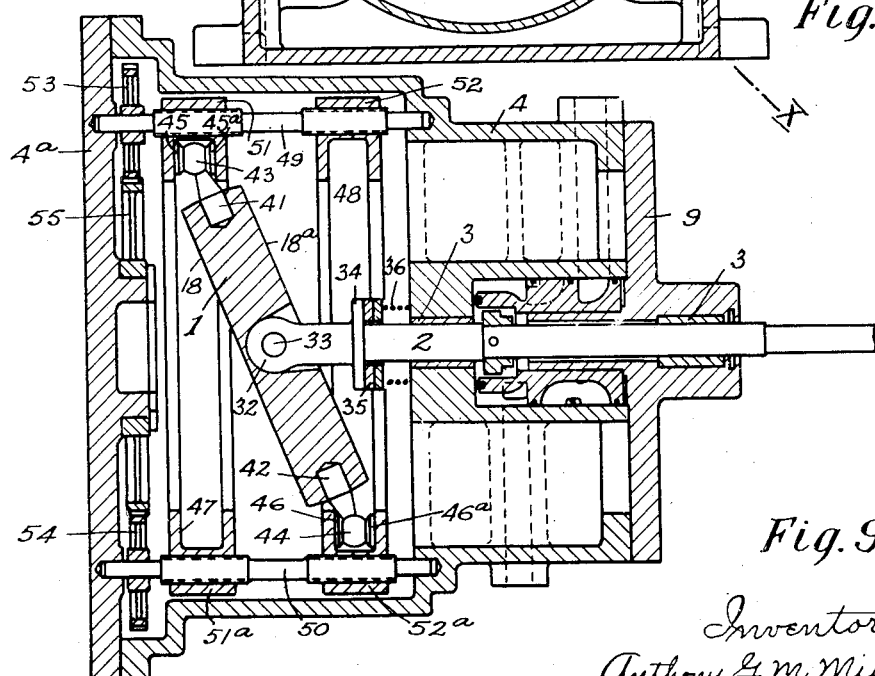
Fig. 9.
Inventor
Anthony G. M. Michell,
By Henry Orth Jr
atty.

April 17, 1928.  1,666,539

A. G. M. MICHELL
SWASH PLATE OR SLANT TYPE RECIPROCO ROTARY MECHANISM

Filed May 23, 1924  6 Sheets-Sheet 3

Inventor
Anthony G. M. Michell,
By Henry Orth Jr.
atty.

April 17, 1928.  1,666,539

A. G. M. MICHELL
SWASH PLATE OR SLANT TYPE RECIPROCO ROTARY MECHANISM
Filed May 23, 1924  6 Sheets-Sheet 5

Inventor
Anthony G. M. Michell,
By Henry Orth
atty.

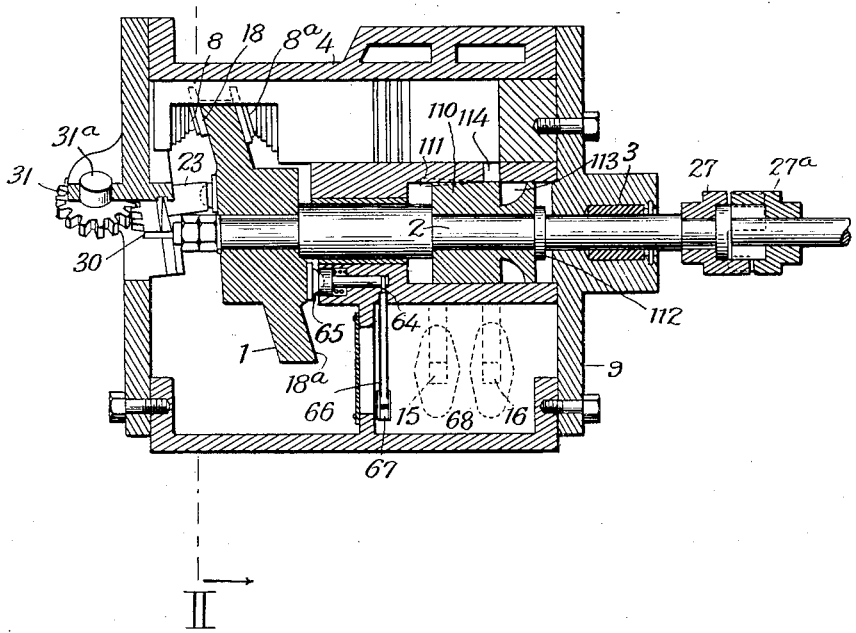

Patented Apr. 17, 1928.

1,666,539

UNITED STATES PATENT OFFICE.

ANTHONY GEORGE MALDON MICHELL, OF MELBOURNE, VICTORIA, AUSTRALIA, ASSIGNOR TO CRANKLESS ENGINES LIMITED, OF MELBOURNE, VICTORIA, AUSTRALIA.

SWASH-PLATE OR SLANT TYPE RECIPROCO-ROTARY MECHANISM. REISSUE

Application filed May 23, 1924, Serial No. 715,491, and in Australia July 4, 1923.

In crankless mechanism of the swash plate or slant type as described in United States Reissue Patent No. 15,756 Patent No. 1,418,598 and application Serial No. 545,193 dynamical balance is dependent upon the employment of at least three main reciprocating elements spaced at equal angular intervals relative to the circumference of the slant and by a correct adjustment to each other of the masses of the slant and said reciprocating elements. Such balance is not however obtainable in this way where the number of reciprocable elements is less than three and it is the primary object of the present invention to achieve such balance where only the said lesser number of reciprocable elements is used in the crankless mechanism.

Further as an important but subsidiary feature to said primary object the invention contemplates that the means employed for attaining the latter object shall also be capable of combining when desired, the facility for varying the longitudinal position and/or the stroke of the reciprocating elements.

Other objects in addition to the foregoing primary and subsidiary features are included in the present invention which will be hereinafter set forth and one of such objects where two cylinders are arranged to co-act with the slant and are located to subtend an angle of approximately 90 degrees at the axis of the slant, is to secure a balance of the moments of momentum of the pistons in two planes at right angles to one another as well as a balance of the axial momentum of the slant.

Briefly stated the primary object is attained by a swash plate having parallel movement along its longitudinal axis whereby it is capable of performing a longitudinal or axial reciprocating motion synchronous with its rotary motion in combination with means for controlling said first motion as hereinafter explained.

One practical method of controlling said motion consists in providing an abutment block contacting with each working face of the swash plate between the axis and circumference of the latter, the contacting surfaces of which abutment blocks are capable of articulated movement.

By providing for adjustment of said blocks in a direction parallel to the axis of rotation of the slant the subsidiary feature beforementioned is attainable viz: adjustment of the clearance between the reciprocating elements (such as pistons) and the cylinder head and also of the stroke of the said elements.

Futher by locating two of the reciprocal elements co-acting with a slant having the synchronous axial reciprocating and rotary motions stated, at angles equally apart from a vertical plane and controlling the degree of longitudinal motion of the slant with regard to the relative weights of the reciprocable elements and attachments and of the slant and its attachments, so that the longitudinal momentum of the former is equal and opposite to that of the latter, the moving parts will be in true dynamical balance as regards their longitudinal motions.

Again in order to attain in addition true dynamical balance between the moments of momentum of the slant and reciprocable elements about all axes so that the motion of the parts of the machine will not tend to communicate any vibration whether linear or rotational to its frame or supports it is necessary to observe two further relations as hereinafter set out.

In the accompanying drawings the forms and arrangement of the parts constituting crankless mechanisms embodying the features of the present invention are depicted and for convenience the mechanisms illustrated are in the form of air-compressors. It has however to be understood that the invention is equally applicable to various classes of machines of the crankless type specified which involve the conversion of rotary to reciprocatory motion or vice versa.

Figure 11:
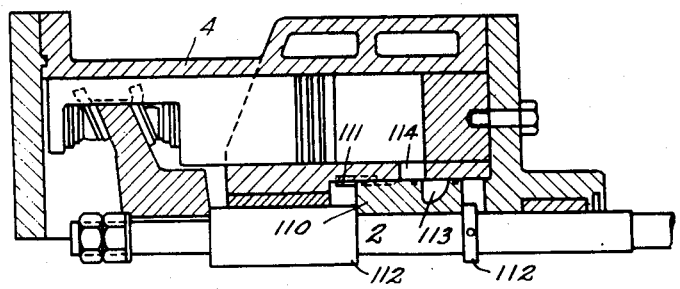
Figure 12:
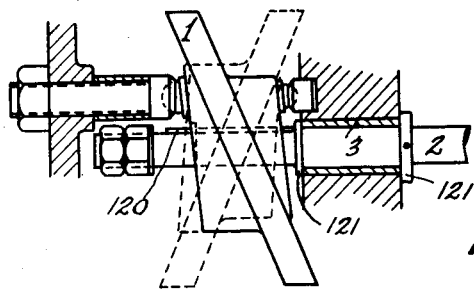
Figure 13:
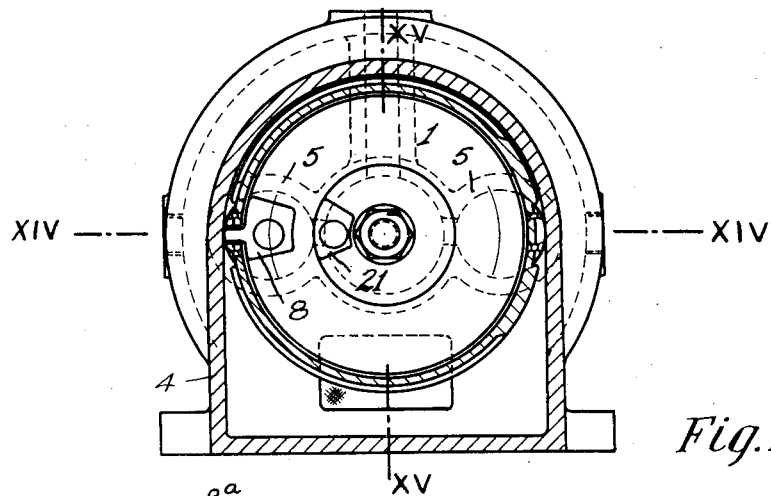
Figure 15:
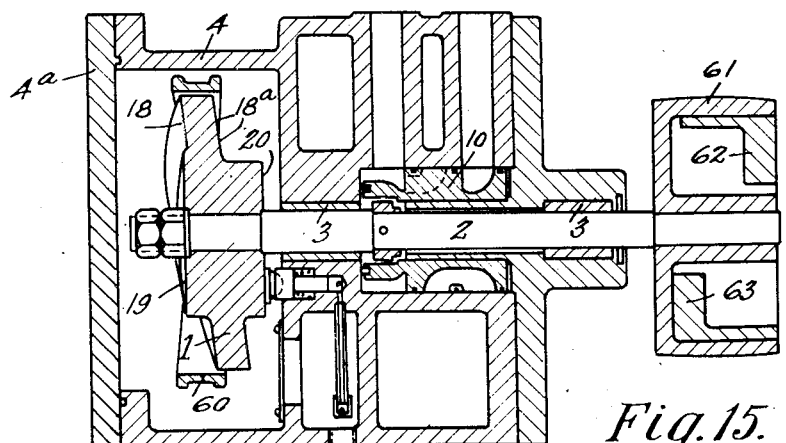
Figure 16:
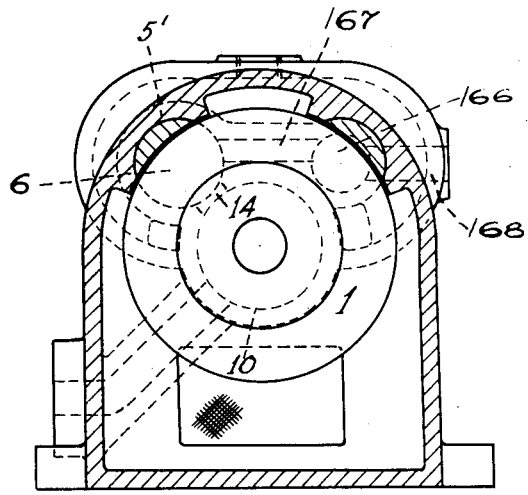
Figure 17:
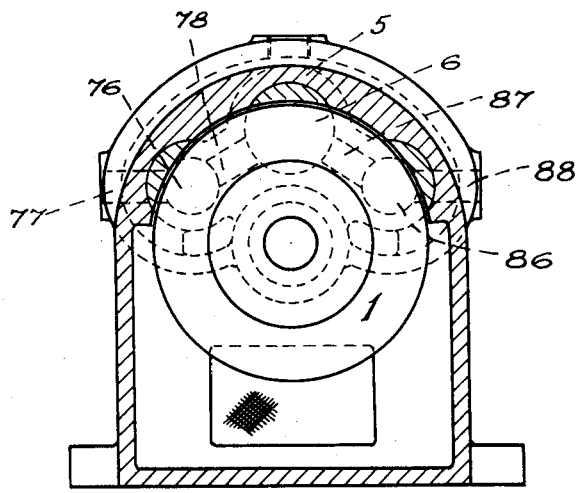

Figure 1 of the drawings is a vertical axial section on line I—I of Figure 2 of a compressor embodying the invention, Figure 2 being a cross section of the same machine, the section being taken on line II, II of Figures 1 and 18. Figure 3 is a partial oblique axial section on line III, III of Figure 2, Figure 4 being a cross section on the line IV, IV of Figure 1 of a detail of the machine. Figure 5 is a diagrammatic view illustrating the functions of the principal parts, while Figures 6 and 7 show modifications of some of the parts designed for effecting adjustments as hereinafter explained. Figures 8, 9, 10 illustrate a modified form of the construction shown in previous figures of drawings. Figure 8 being a cross section and Figures 9 and 10 respectively horizontal and partial oblique axial sections taken on the lines IX, IX and X, X of Figure 8. Figures 11, 12 are partial axial sections showing alternative modes of construction of some of the parts. Figure 13 is a cross section of a further modification and Figures 14 and 15 respectively horizontal and vertical axial sections on the lines XIV, XIV and XV, XV of Figure 13. Figures 16 and 17 are cross sections, corresponding to Figure 1, of further modified forms of construction. Fig. 18 is a section on line XVIII—I Fig. 2, and, similar to Fig. 1, showing the relation of the adjusting means.

According to Figure 1 the swash-plate (hereinafter called the slant) is rigidly mounted upon a shaft 2, which rotates in fixed bearings 3, 3. The frame 4 of the machine together with the cover 4ª encloses the slant 1, and the former comprises cylinders 5, 5, whose axes are parallel to that of the shaft 2. Each cylinder contains a piston 6, adapted to reciprocate therein and furnished with a rigid extension, in the form of a yoke 7, and with slippers 8, 8ª, whereby operative connection is made with the slant 1 so that the piston makes one complete reciprocative movement for each revolution of the slant. The form of such operative connection between the slant, slippers and pistons, as herein illustrated is that described in the prior Patent 1,409,057 cited above, but it is to be understood that the present invention is applicable to any type of slant or swash-plate, whether operating in conjunction with slippers, or with ball-races, or otherwise, provided that it is adapted to an exactly, or approximately, harmonic motion of the pistons or other reciprocating elements in synchronism with its own rotation.

As shown in Figure 2. the cylinders 5, 5, are located so that two planes which respectively pass through the axis of one of the cylinders 5 and the axis $c$ of the shaft 2 make with the vertical line 1, 1 angles which will be denoted by the symbol Z, being each equal to the acute angle between the lines I—I and III—III of Figure 2. The heads of the cylinders 5, may be closed with cylindrical blocks 9ª, attached to a common cover 9 bolted to the frame 4. The movement of the fluid through the cylinders 5 is controlled by a rotary-valve 10, revolving on a cylindrical inward extension 11 of the cover 9, and furnished with ports and passages 12, 13 which bring the interior of the cylinder 5 alternately into communication through the cylinder port 14 with the induction and delivery conduits 15, 16, formed in the casing 4. The valve 10 rotates with the shaft 2, being preferably driven therefrom by means of a coupling member 17, which allows by well known means, as shown in Figure 4, for any slight eccentricity of the valve 10 and shaft 2, and also permits longitudinal movement of the coupling member 17, and the shaft 2 to which it is attached, relatively to the valve 10 for the purpose hereinafter stated.

Alternatively to the rotating valve 10 an annular valve 110 as shown in Figure 11 may be fitted to slide longitudinally in the casing 4, being prevented from rotating therein by a fixed guide 111. The valve 110 is caused to oscillate longitudinally with the shaft 2, by contact with the collars 112 on the latter, a port 113 in the valve being thus caused to alternately open and close cylinder ports 114. The shaft 2 revolves in the valve 110 which thus forms one of the main bearings of the machine.

The slant 1, in addition to its working faces 18, 18ª, which make operative contact with the slippers, 8, 8ª respectively, is formed with a pair of parallel working faces 19, 20, Figs. 1 and 3, which are preferably plane and inclined to the axis of the shaft 2 more nearly at right-angles than the faces 18, 18ª, but with the same direction of slope, their precise inclination being determined as hereinafter set out. A slipper 21, universally jointed, as by a ball 22, to the abutment 23, and a similar slipper 24 universally jointed on the abutment 25, make operative contact respectively with the faces 19 and 20.

The abutments 23, 25 are longitudinally adjustable, being for instance screwed into the frame of the machine, as shown in the case of the abutment 23, or by packing pieces 26, as shown in the case of the abutment 25. By such means the abutments are adjusted so that the slippers 21, 24 make simultaneous operative contact, with proper working clearance only, with the faces 19, 20 of the slant. It will be understood that as the slant revolves in operative contact with the abutments 23, 25, there is communicated to it a longitudinal reciprocating motion synchronous with its rotation. This action is illustrated in Figure 5 which shows the slant 1 in its two extreme positions to the left and right corresponding to a rotation of 180 degrees of the shaft. It will be seen that as the faces 19, 20, revolve from the positions shown by full lines to the positions, 19ª, 20ª, shown by dotted lines, remaining respectively in contact with the slippers 21 and 24, the central point of the slant 1 shifts longitudinally through the distance D from the position shown by the full line S, to that shown by the dotted lines S¹. It will also be understood that, the faces 19, 20 being plane and the rate of rotation of the slant uniform, such longitudinal motion of the slant is harmonic.

The shaft 2, being rigidly secured to the slant, and likewise any members mounted thereon, such as the half-coupling 27, participate in this longitudinal reciprocating motion of amplitude D. If the corresponding half-coupling 27A, and the shaft to which it is attached are not adapted to partake of the same motion, one of the well-known types of coupling, such as that shown, which permits of the necessary relative longitudinal motion of its two halves is provided.

The inclination of the faces 19 and 20, of the slant to the faces 18, 18a, is so assigned with regard to the relative weights of the pistons with their attachments and of the slant together with the parts attached thereto, that the longitudinal momentum of the former is equal and opposite to that of the latter.

Expressing this relation by symbols, if $m$ is the mass of each of the pistons including the attachments reciprocating with it, and $M$ the mass of the slant with its attachments and $D$ is as above the longitudinal travel of the slant, and $d$ the longitudinal travel of the pistons relative to the slant, the relation to be observed is $(M+2m) D = 2md \cos Z$, $Z$ being the angle defined above. This relation being observed, the moving parts will be in true dynamical balance as regards their longitudinal motions.

In order to secure in addition true dynamical balance between the moments of momentum of the slant and pistons about all axes, so that the motion of the parts of the machine will not tend to communicate any vibration, whether linear or rotational, to its frame or supports, it is necessary to observe further two dynamical conditions, or relations.

Firstly, the angle Z is to be determined from the relation $\cos 2Z = \dfrac{D}{d} \cos Z$, and secondly, if the slant is regarded as being made up of two oblique slices of hollow circular cylinders whose respective external radii are $R_1$ and $R_2$, and internal radii $R_2$ and $r$, their respective masses being $M_1$ and $M_2$, and the tangents of the respective angles of obliquity of the parallel faces of these slices being $t_1$ and $t_2$, the formula to be observed is:

$$M_1(R_1^2 + R_2^2) + M_2(R_2^2 + r^2)\dfrac{t_2}{t_1} = 8mA^2 \sin^2 Z.$$

The radii $R_1$, $R_2$, and $r$, and the distance A between the axis of the slant and the axis of each of the pistons, are indicated in Figure 2.

It will be observed from the first formula in the preceding paragraph that if, as will be usually the case, the travel D of the slant is very short compared to $d$ the stroke of the pistons, cosine 2Z will be much smaller than cosine Z, or in other words 2Z will be nearly equal to but somewhat less than 90 degrees. For practical convenience 2Z may usually be made exactly 90 degrees, as shown in the figures without incurring any serious amount of vibration in the operation of the machine.

It will also be seen from the above statement, that whereas according to the prior Patent 1,409,057, it was necessary in order to secure dynamical balance that there should be at least 3 piston elements arranged at equal angular intervals around the shaft, it is in the present case necessary to provide only two pistons of appropriate masses in relation to the mass of the slant, in order to effect complete balance both as regards the longitudinal and the angular moments.

If the conditions of balance as above set forth are correctly provided, the slant and its attachments will, so far as kinetic effects are concerned, oscillate longitudinally with travel D, without exerting any forces on the slippers 21 and 24 or abutments 23 and 25, these then serving merely to define the location of the slant without being subjected to load therefrom. Consequently, while the fluid pressures in the cylinders 5, transmitted through the pistons 6 and slipper 8a to the working face 18a, impose a load on the slipper 21 and abutments 23 at every working stroke of the pistons, no corresponding load is required to be carried by the slipper 24 and abutment 25. The construction shown in Figure 6 may therefore be adopted, in which the abutment 23, as in Figure 1, is screwed in the cover 4a, being provided with a handwheel 37 for turning, and nut 37a for locking the screw. The opposing abutment 25, provided in this case with a stem 28, is fitted to slide longitudinally in the frame 4 and a spring 29 is applied between the frame and the abutment so as to maintain the slipper 24 in contact with the slant face 20.

By turning the hand-wheel 37, the longitudinal position of the slipper 21 and consequently of the slant 1 and pistons 6, corresponding to any rotational position of the slant can be adjusted and thus the clearance between pistons 6 and the cylinder heads 9a, can be varied even during operation of the machine without however varying the travel of the slant or stroke of the pistons, the spring 29 yielding so as to allow the abutment 25 and slipper 24 to take any position corresponding to that of the abutment 23 and slipper 21.

By the alternative means shown in Figure 7 for moving the abutment 23 both the cylinder clearance and the piston stroke can be varied during operation. In this case the abutment 23 is mounted in a separate carriage 30 adapted to be moved as by the pinion 31 on shaft 31a in a radial direction with respect to cover 4a. If the guides 23a of the abutment 23, are inclined so that the movement of the abutment is parallel to that of the face 19, in the position of the latter which corresponds with minimum clearance between the pistons and cylinder heads, the stroke only of the abutment and the longitudinal travel of the slant are varied by rotating the pinion 31. By giving the guides 23ᵃ different directions in the radial plane the slipper is given a component of motion in the direction of the axis and the stroke of the slant and the stroke and clearance of the pistons can be simultaneously varied. It is to be noted however that such adjustment of the longitudinal travel of the slant, disturbs the relation $(M+2m)D = 2md \cos Z$ above stated for the longitudinal dynamical balance, the latter being consequently only strictly accurate for one particular radial position of the abutment 23.

It will be understood that although usually convenient, it is not essential to the practical performance of the invention that the shaft should be rigidly fixed to the slant and oscillate longitudinally therewith. As an alternative the arrangement shown in Figure 12 may be adopted. As shown in this figure, the slant 1 is mounted on a parallel portion of the shaft 2, on which it is free to slide longitudinally while the shaft and slant are compelled to rotate together by the feather 120. The shaft 2 is fitted with thrust collars 121, which restrain it from moving longitudinally while rotating in the bearings 3, 3.

It will be understood that in this case the mass of the shaft, valve, et cetera, are not to be included with that of the slant in applying the stated formula for the longitudinal balance.

In the specific form of construction shown in Figures 8, 9, 10 the slant 1, shaft 2, bearings 3 frame 4 with covers 4ᵃ and 9, cylinders 5, pistons 6, slippers 8ᵃ, and working face 18ᵃ, are similar and similarly arranged to the parts correspondingly numbered in Figures 1 to 7. According to the present construction however, the slant 1 instead of being rigidly mounted on the shaft 2, is connected thereto in such a manner that the angle of inclination of the face 18ᵃ to the axis of the shaft is variable, while the slant and shaft are nevertheless constrained to rotate together. The shaft 2 may for this purpose be formed with the portion whereon the slant is mounted in the shape of an eye of rectangular section as shown at 32 in Figure 8, and the slant, being formed with a rectangular hole to fit thereon, may be secured to the shaft by a pin 33. The shaft 2 is also furnished with an integral or rigidly fitted thrust collar 34 revolving against a thrust bearing 35, whose stationary members are supported from the frame 4, by a spring 36. The pistons 6, in this form of construction Fig. 10 have each one slipper only 8ᵃ, coacting with the face 18ᵃ, of the slant 1. The opposite face 18, is maintained in contact with the slipper 21 of the abutment 23, these latter being similar to the corresponding parts in Figures 1 to 7.

In cases where the fluid pressure in the cylinder is not sufficient to maintain operative contact between the faces of the slippers 8ᵃ and 21 and the slant at all times, springs 40 may be applied in the cylinder to supplement such pressure, as in the construction shown in Figure 8 of the prior Patent 1,409,057.

Alternatively a retaining plate behind the slippers may be employed as in the prior Patent 1,418,598.

In order to vary the inclination of the slant 1 at will, it is fitted with two studs 41, 42, at opposite ends of its median line of greatest slope, these studs having ball ends 43, 44, on which pairs of slippers 45, 45ᵃ, 46, 46ᵃ, are respectively mounted. These pairs of slippers revolve respectively in annular channels 47, 48, having plane lateral faces with which the slippers make film-lubricated working contact. The channels 47, 48, are restrained from revolving with the slippers by a pair of screwed rods, 49, 50, Fig. 9 each of which passes through screwed holes in bosses arranged in pairs 51, 51ᵃ, 52, 52ᵃ at diametrically opposite sides of the channels. The screw threads in the bosses 51, 51ᵃ, of the channel 47 are of like hand but opposite to the hand of the threads in the bosses 52, 52ᵃ of the channel 48. Toothed wheels 53, 54, are non-rotatably mounted on the rods 49, 50 respectively, and gear with a control toothed wheel 55, which can be rotated at will by the pinion 56, spindle 57 and hand-wheel 58, Figure 10. By this means the channels 47, 48, can be brought nearer to one another or moved apart, remaining always parallel, and the obliquity of the slant 1 can be correspondingly reduced or increased. The rods 49, 50, are free both to rotate and to slide longitudinally in holes in the frame 4, and cover 4ᵃ, but said rods have no rotary movement other than that applied thereto by the toothed wheels 53, 54.

It will be understood that as the pistons 6 reciprocate, the slant 1, together with the shaft 2 and its attachments, and the channels 47, 48, as well as the rods 49, 50, execute a longitudinal oscillation of opposite phase to the oscillation of the centre of mass of the pistons, thus alternately compressing and expanding the spring 36.

The amplitude of this oscillation is determined by the relation already stated in connection with Figures 1 to 7.

Figure 14:
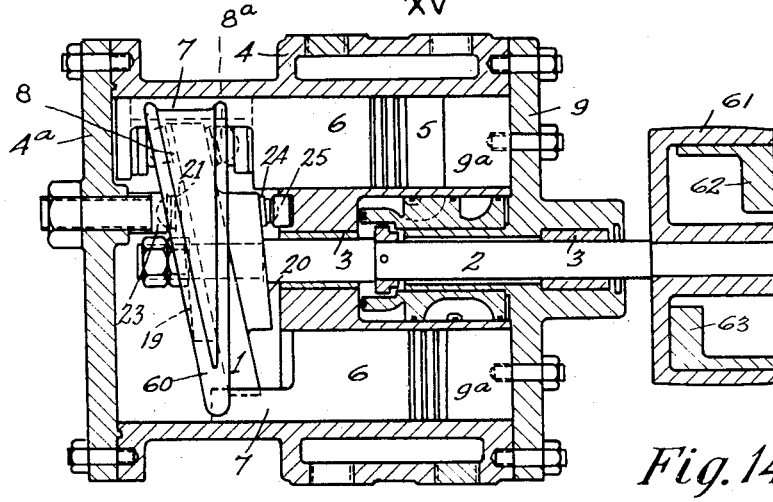

The specific form of construction shown in Figures 13, 14 and 15 agrees with the form which has been already described in connection with Figures 1 to 7 in the general construction and arrangement of the slant 1, shaft 2, bearings 3, 3, frame 4 with covers 4ª and 9, and valve 10, as well as in the form of the slant with faces 18, 18ª, 19 and 20, and of the slippers 21 and 24, and abutments 23 and 25.

It differs however from the former construction in that the two cylinders 5 containing the pistons 6 instead of subtending an angular interval of approximately or exactly 90 degrees at the axis of the shaft, are diametrically opposite to one another and in that the two pistons 6 are connected rigidly together by means of the circumferential element 60, (hereinafter referred to as the collar 60) attached to the yokes 7, one only of these pistons 6 being fitted as in the construction shown in Figures 1 to 7, with slippers 8, 8ª, engaging with the slant faces 18, 18ª. The two pistons 6, and their attachments are thus compelled to reciprocate in the same phase and as a rigid whole together with the collar 60.

It will be seen from the relative positions of these slippers 8, 8ª, with respect to the slippers 21, 24 which engage with the slant faces 19, 20, that the slant 1, shaft 2, and other parts rigidly attached thereto are constrained to execute a longitudinal oscillation in opposite phase to the resultant reciprocation of the pistons 6 and collar 60. These oppositely-moving masses will be in dynamical balance longitudinally if $MD = Q(d-D)$ where M, D and d have the same meanings as before, and Q is the total weight of the two pistons 6, collar 60, and other parts reciprocating therewith.

As regards dynamical moments of momentum the two pistons 6, having their axes in the same plane with the shaft 2, are not in this case capable of effecting balance with the slant. Such balance may however be effected, by mounting upon the shaft 2, additional masses to provide a product of inertia equal and opposite to that due to the slant. Thus if a pulley 61 is applied for driving the shaft, suitable blocks, 62, 63 may be fitted therein on opposite sides of the shaft, and spaced apart longitudinally as indicated. The weight of such pulley and blocks must of course be included in the total weight M used in the formula given above for the longitudinal balance.

In either of the forms of construction above described, lubrication may be effected by means of a reciprocating oil pump as shown in Figure 1 having a plunger 64, adapted to coact with one of the faces 20, of the slant 1, by a slipper 65, such pump drawing oil from the oil chamber 68 in the base of the machine through suction pipe 66, and suction valve 67, and delivering it, by passages not shown to the bearings 3, and other parts where lubrication is required.

It is to be understood that the specific forms of construction hereinbefore described, are merely instances of the generic construction covered by this specification and defined in the appended claims. In particular, it is to be understood that the integers constituting the reciprocable elements are subject to wide variations according to the particular purpose of the machines.

Thus as a modification of the constructions shown in Figures 1 to 10 one of the pistons 6 may be replaced by a piston valve 166, Fig. 16 provided with slippers whereby they are actuated by the slant 1 in the same way as the pistons above described. The valve 166 may serve to open and close ports 167, 168, as it reciprocates, thus controlling discharge of fluid from the cylinder 5, intake thereto being controlled by rotary valve 10 as above described in connection with Figures 1 to 5.

In the further modification shown in Figure 17, the single piston 6, reciprocating in cylinder 5, is associated with a piston-valve 76 on one side, controlling admission to the cylinder 5 through ports 77, 78, and a second piston-valve 86, on the other side controlling delivery from the cylinder 5, through ports 87, 88. The piston 6, and the valves 76 and 86, are each provided with slippers whereby they are actuated by the slant 1, as above described. It will be understood by those skilled in such calculations that the dynamical effect of the piston 6, and piston valves 76 and 86 can be made, by appropriate assignment of the weights of these parts, and of the angles subtended by them at the axis of the slant 1, the same as that of the two pistons 5 described in connection with Figures 1 to 5. The calculation requires that the angle subtended at the axis by the valves 76 and 86 shall be greater than that subtended by the two pistons 6, 6, and will usually be greater than 90 degrees.

It is also to be understood, that in many cases, a partial balance, either of the longitudinal or of the angular momentum of the parts, is all that is in practice requisite. In such cases further modifications or simplifications of the construction may be made.

For instance in the form shown in Figures 1 to 5, one piston or other reciprocating part only may be used, located e. g. in the same vertical plane as the shaft.

The relative masses of the slant et cetera, and piston et cetera, may then be determined by the relation $MD = m(d-D)$ whereby exact longitudinal balance will be effected, and exact angular balance may at the same time be secured in either the vertical or horizontal plane, whichever is considered to be more important in the particular case, it not being possible with such simplified construction to attain balance in both these planes.

Alternatively in such case it may be preferred to design the parts for unequal degrees of unbalance in both the vertical and horizontal planes, and it may be considered sufficient to provide for only partial longitudinal balance between the pistons or piston and slant.

I claim:

1. In mechanism for the inter-conversion of reciprocating and rotary motions, a slant, less than three reciprocable elements co-acting therewith, and means to simultaneously permit and control longitudinal movement of the slant along its axis of rotation synchronously with the rotation.

2. In mechanism for the inter-conversion of reciprocating and rotary motions, a slant, less than three reciprocable elements co-acting therewith, means to simultaneously permit and control the longitudinal movement of the slant along its axis of rotation synchronously with the rotation and means to vary the extent of such longitudinal movement.

3. In mechanism for the inter-conversion of reciprocating and rotary motions, a slant, and less than three reciprocable elements co-acting therewith; in combination with supporting means for the slant, means to cause relative longitudinal movement between the slant and its supporting means, and means for varying the mean position of said slant relatively to its axis of rotation.

4. In mechanism for the inter-conversion of reciprocating and rotary motions, a slant, an axial supporting shaft therefor, less than three reciprocating elements co-acting with the slant, means controlling an axial reciprocation of the slant and means for varying the extent of said motion.

5. In mechanism for the inter-conversion of reciprocating and rotary motions, a slant having axial reciprocating motion, a cylinder, a piston therein co-acting with said slant, and means simultaneously controlling the reciprocal travel of the slant and the clearance of the piston in its cylinder.

6. In mechanism for the inter-conversion of reciprocating and rotary motions, a slant, a shaft therefor, a reciprocable piston co-acting with said slant, means causing and controlling an axial reciprocating motion of said slant and means for simultaneously controlling the reciprocating travel of the slant and piston.

7. In mechanism for the inter-conversion of reciprocating and rotary motions, an axially reciprocating slant having two pairs of parallel working faces of differing inclinations and an articulated slipper co-acting with each of said faces, for the purpose specified.

8. In mechanism for the inter-conversion of reciprocating and rotary motions, an axially reciprocating slant, less than three reciprocal elements co-acting with said slant, a stationary abutment, and a slipper articulated to said abutment and making working contact with said slant.

9. In mechanism for the inter-conversion of reciprocating and rotary motions, an axially reciprocating slant, an abutment, a slipper articulated thereto and in working contact with said slant, and means whereby said abutment can be adjusted with a component movement in the direction of the axis of said slant.

10. In mechanism for the inter-conversion of reciprocating and rotary motions, an axially reciprocating slant, a pair of reciprocating members caused to reciprocate by said slant and an articulated slipper making working contact with said slant to cause reciprocation of the latter in the direction of its axis.

11. In mechanism for the inter-conversion of reciprocating and rotary motions, an axially reciprocating slant, a pair of reciprocating elements located approximately at a right angle to each other with respect to the axis of said slant and caused to reciprocate by means of said slant, and an articulated slipper in working contact with a face of said slant to reciprocate the slant in the direction of its axis.

12. In mechanism for the inter-conversion of reciprocating and rotary motions, an axially reciprocating slant, two reciprocating elements co-acting with the working faces of the slant and an added pair of parallel working faces on said slant, said latter faces being plane, inclined and more nearly at right angles to the axis of the slant than the working faces on the latter, and a slipper contacting with each of said added faces and each slipper articulated to an abutment, for the purpose herein specified.

13. In mechanism for the inter-conversion of reciprocating and rotary motions, reciprocal elements and attachments thereto, an axially reciprocating slant having attached parts and having two pairs of parallel faces at different inclinations, the inclination of one pair of faces to the remaining faces on the slant being chosen with regard to the relative weights of the reciprocal elements and their attachments, and of the slant together with the parts attached thereto, so that the longitudinal momentum of the former is equal to and opposite to that of the latter and abutments for the slant.

14. In mechanism for the inter-conversion of reciprocating and rotary motions, an axially reciprocating slant, two reciprocating pistons co-acting with inclined faces of the slant, additional inclined faces on the slant, abutments co-acting with the latter faces to effect longitudinal travel of the slant, the said travel relatively to the travel of the pistons being characterized by the relation $(M+2m)D = 2md \cos Z$, in which $m$ is the mass of each piston including any attachments reciprocating with it, $M$ the mass of the slant and its attachments, $D$ the longitudinal travel of the slant, $d$ the longitudinal travel of the pistons relatively to the slant, and Z the angle of each piston relative to the vertical, as and for the purpose herein specified.

15. In mechanism for the inter-conversion of reciprocating and rotary motions, an axially reciprocating slant having two pairs of faces at an angle to each other, a pair of pistons co-acting therewith, articulated slippers, a pair of abutment members co-acting through said articulated slippers with working faces on said slant and controlling the reciprocating motion of the slant, and means for adjusting one of said abutments in a radial direction, as and for the purpose herein described.

16. In mechanism for the inter-conversion of reciprocating and rotary motions, an axially reciprocating slant, a pair of pistons cooperating with the slant, a pair of abutments co-acting with the slant, and means for effecting the adjustment of one of the latter; in combination with means for guiding said adjustment means, whereby the strokes of the slant and the pistons and the clearance of the latter can be simultaneously varied, as hereinbefore described.

17. In mechanism for the inter-conversion of reciprocating and rotary motions, an axially reciprocating slant, and a pair of pistons co-acting therewith the angle Z between them being determined by the equation $\cos 2Z = \dfrac{D}{d} \cos Z$ when D is the longitudinal travel of the slant and $d$ the longitudinal travel of the pistons relatively to the slant.

18. In mechanism for the inter-conversion of reciprocating and rotary motions, an axially reciprocable slant having two pairs of faces at an angle to one another, two cylinders the angle between them being less than but approaching 90°, pistons in said cylinders co-acting with one pair of faces of said slant, abutments co-operating with said other pair of faces, and means to move one of the abutments in a direction across its co-acting face, the other abutment being yieldingly mounted.

Dated this fourteenth day of April, 1924.

ANTHONY GEORGE MALDON MICHELL.